(12) United States Patent
Hadzidedic et al.

(10) Patent No.: US 10,338,545 B2
(45) Date of Patent: Jul. 2, 2019

(54) HVAC CONTROLLER HAVING MULTIPLEXED INPUT SIGNAL DETECTION AND METHOD OF OPERATION THEREOF

(71) Applicant: Lennox Industries Inc., Richardson, TX (US)

(72) Inventors: Darko Hadzidedic, Carrollton, TX (US); Sakthi Narayan Kumar Murugesan, Chennai (IN); Anitha Rajappan, Chennai (IN)

(73) Assignee: Lennox Industries Inc., Richardson, TX (US)

( * ) Notice: Subject to any disclaimer, the term of this patent is extended or adjusted under 35 U.S.C. 154(b) by 654 days.

(21) Appl. No.: 14/692,350

(22) Filed: Apr. 21, 2015

(65) Prior Publication Data

US 2015/0331432 A1 Nov. 19, 2015

Related U.S. Application Data

(60) Provisional application No. 62/000,355, filed on May 19, 2014.

(51) Int. Cl.
*G05B 15/02* (2006.01)
*G05D 23/19* (2006.01)

(52) U.S. Cl.
CPC ............ *G05B 15/02* (2013.01); *G05D 23/19* (2013.01); *G05B 2219/2642* (2013.01)

(58) Field of Classification Search
CPC . G05B 15/02; G05B 2219/2642; G05D 23/19
See application file for complete search history.

(56) References Cited

U.S. PATENT DOCUMENTS

| | | | | | |
|---|---|---|---|---|---|
| 4,083,229 | A | * | 4/1978 | Anway | G01M 3/243 73/40.5 A |
| 4,215,408 | A | * | 7/1980 | Games | F24F 11/00 165/211 |
| 4,303,978 | A | * | 12/1981 | Shaw | G01C 21/16 244/177 |
| 4,310,878 | A | * | 1/1982 | Hyatt | B60R 16/0373 318/608 |
| 4,820,059 | A | * | 4/1989 | Miller | G10L 15/04 704/238 |
| 5,009,076 | A | * | 4/1991 | Winslow | F25B 49/005 62/129 |
| 5,452,173 | A | * | 9/1995 | Brannon | G01R 31/42 361/90 |

(Continued)

*Primary Examiner* — Frantz F Jules
*Assistant Examiner* — Nelson J Nieves
(74) *Attorney, Agent, or Firm* — Winstead PC

(57) ABSTRACT

A heating, ventilation and air conditioning (HVAC) controller, a method of detecting multiplexed input signals and an HVAC system employing the controller or the method. In one embodiment, the HVAC controller includes: (1) a signal conditioner configured to convert received alternating current (AC) input signals into corresponding square wave signals of a digital logic voltage, (2) a multiplexer coupled to the signal conditioner and configured to select one of the square wave signals and (3) a sample analyzer coupled to the multiplexer and configured to evaluate multiple samples of the selected one of the square wave signals to derive a binary state.

12 Claims, 2 Drawing Sheets

(56) References Cited

U.S. PATENT DOCUMENTS

| | | | | |
|---|---|---|---|---|
| 5,457,310 | A * | 10/1995 | Fournier | F41G 3/326 250/206.2 |
| 5,798,945 | A * | 8/1998 | Benda | F24F 11/001 340/538 |
| 5,833,134 | A * | 11/1998 | Ho | F24F 11/0076 236/49.3 |
| 5,847,753 | A * | 12/1998 | Gabello | G01N 21/8903 348/125 |
| 5,914,922 | A * | 6/1999 | Supino | G11B 7/08541 369/44.28 |
| 6,012,296 | A * | 1/2000 | Shah | F24F 3/153 165/228 |
| 6,087,968 | A * | 7/2000 | Roza | H03M 3/432 341/143 |
| 6,348,816 | B1 * | 2/2002 | Havens | G01R 19/16571 327/58 |
| 6,426,845 | B1 * | 7/2002 | Sacks | G11B 5/5552 360/29 |
| 2001/0015918 | A1 * | 8/2001 | Bhatnagar | G05B 19/0423 365/200 |
| 2002/0010518 | A1 * | 1/2002 | Reid | G06Q 10/087 700/31 |
| 2005/0089027 | A1 * | 4/2005 | Colton | H04Q 11/0005 370/380 |
| 2005/0093709 | A1 * | 5/2005 | Franco, Jr. | A61B 5/1112 340/686.1 |
| 2005/0217260 | A1 * | 10/2005 | Desjardins | F16D 31/02 60/421 |
| 2005/0242667 | A1 * | 11/2005 | Emori | B60L 3/0046 307/10.1 |
| 2006/0272830 | A1 * | 12/2006 | Fima | E03B 1/00 169/16 |
| 2008/0030239 | A1 * | 2/2008 | Sullivan | G01R 13/0254 327/78 |
| 2009/0195349 | A1 * | 8/2009 | Frader-Thompson | G01D 4/002 340/3.1 |
| 2009/0322800 | A1 * | 12/2009 | Atkins | G09G 3/3413 345/690 |
| 2012/0144981 | A1 * | 6/2012 | Ciccone | G01D 5/2417 84/746 |
| 2013/0153195 | A1 * | 6/2013 | Wallaert | F24F 11/0012 165/239 |
| 2013/0166075 | A1 * | 6/2013 | Castillo | F24F 11/0012 700/277 |

\* cited by examiner

HVAC CONTROLLER HAVING MULTIPLEXED INPUT SIGNAL DETECTION AND METHOD OF OPERATION THEREOF

CROSS-REFERENCE TO RELATED APPLICATION

This application claims the benefit of U.S. Provisional Application Ser. No. 62/000,355, filed by Hadzidedic on May 19, 2014, entitled "HVAC Controller Having Multiplexed Input Signal Detection and Method of Operation Thereof," commonly assigned with this application and incorporated herein by reference.

TECHNICAL FIELD

This application is directed, in general, to heating, ventilation and air conditioning (HVAC) controllers and, more specifically, to an HVAC controller in which input signals are multiplexed.

BACKGROUND

A heating, ventilation and air conditioning (HVAC) system commonly employs a controller for governing the operation of at least some part of the HVAC system. For example, a rooftop unit (RTU), which is most often used to condition a commercial building, may employ a controller to activate a compressor or a furnace to cool or warm air and a blower to deliver the cool or warm air to the building beneath. A controller produces one or more output (control) signals based upon one or more input (sense) signals. Some of these input signals are binary (on/off) in nature. Typical input signals indicate, for example, on/off commands from a thermostat, whether or not a motor is running, or whether or not a compressor is operating normally. The controller may poll or scan (the two terms are used synonymously herein) the various input signals to determine their binary states or, alternatively, the various input signals may be provided as interrupts to the controller, in which case their assertion prompts the controller to determine their binary states.

SUMMARY

One aspect provides an HVAC controller. In one embodiment, the HVAC controller includes: (1) a signal conditioner configured to convert received alternating current (AC) input signals into corresponding square wave signals of a digital logic voltage, (2) a multiplexer coupled to the signal conditioner and configured to select one of the square wave signals and (3) a sample analyzer coupled to the multiplexer and configured to evaluate multiple samples of the selected one of the square wave signals to derive a binary state.

Another aspect provides a method of detecting multiplexed input signals. In one embodiment, the method includes: (1) converting received AC input signals into corresponding square wave signals of a digital logic voltage, (2) selecting one of the square wave signals and (3) evaluating multiple samples of the selected one of the square wave signals to derive a binary state.

Yet another aspect provides an HVAC system. In one embodiment, the HVAC system includes: (1) a compressor, (2) a furnace associated with the compressor, (3) a blower associated with the compressor and furnace and (4) a controller associated with the compressor, the furnace and the blower, the controller having: (4a) a signal conditioner configured to convert AC input signals from at least one of the compressor, the furnace and the blower into corresponding square wave signals of a digital logic voltage, (4b) a multiplexer coupled to the signal conditioner and configured to select one of the square wave signals and (4c) a sample analyzer coupled to the multiplexer and configured to evaluate multiple samples of the selected one of the square wave signals to derive a binary state for controlling at least one of the compressor, the furnace and the blower.

BRIEF DESCRIPTION

Reference is now made to the following descriptions taken in conjunction with the accompanying drawings, in which.

DETAILED DESCRIPTION

As stated above, an HVAC controller may scan the various input signals to determine their binary states. However, scanning consumes significant bandwidth. This is particularly so when input signals are of alternating current (AC), because the signals need to be scanned multiple times to determine their proper binary state. Consequently, the controller must be able to accommodate the greater computational load, which increases its cost and power consumption.

Alternatively, as stated above, the various input signals may be provided as interrupts to the controller, in which case their assertion prompts the controller to determine their binary states. However, interrupts employ physical pins. In a typical conventional controller, each input signal is assigned a separate pin. More input signals require more interrupts; more interrupts require more pins. Increasing the number of pins increases the cost and complexity of the controller.

It is realized herein that an opportunity exists to reduce both the amount of scanning performed and the number of pins employed to detect input signals. It is further realized that it is advantageous to convert the AC input signals, which are initially sinusoidal in shape, to square-wave signals to quantize and therefore reduce variations in voltage level in the input signals. It is yet further realized that input signals may be multiplexed in the time domain to allow a single interrupt pin to support multiple input signals. It is still further realized that hardware and/or software may be employed to analyze multiple samples of the square-wave signals to determine the overall state of the input signals.

Described herein are various embodiments of a controller having multiplexed input signal detection and a method of detecting multiplexed input signals. Before describing the embodiments in detail, an example of an overall HVAC system having such controller or employing such method will be described.

Figure 1:
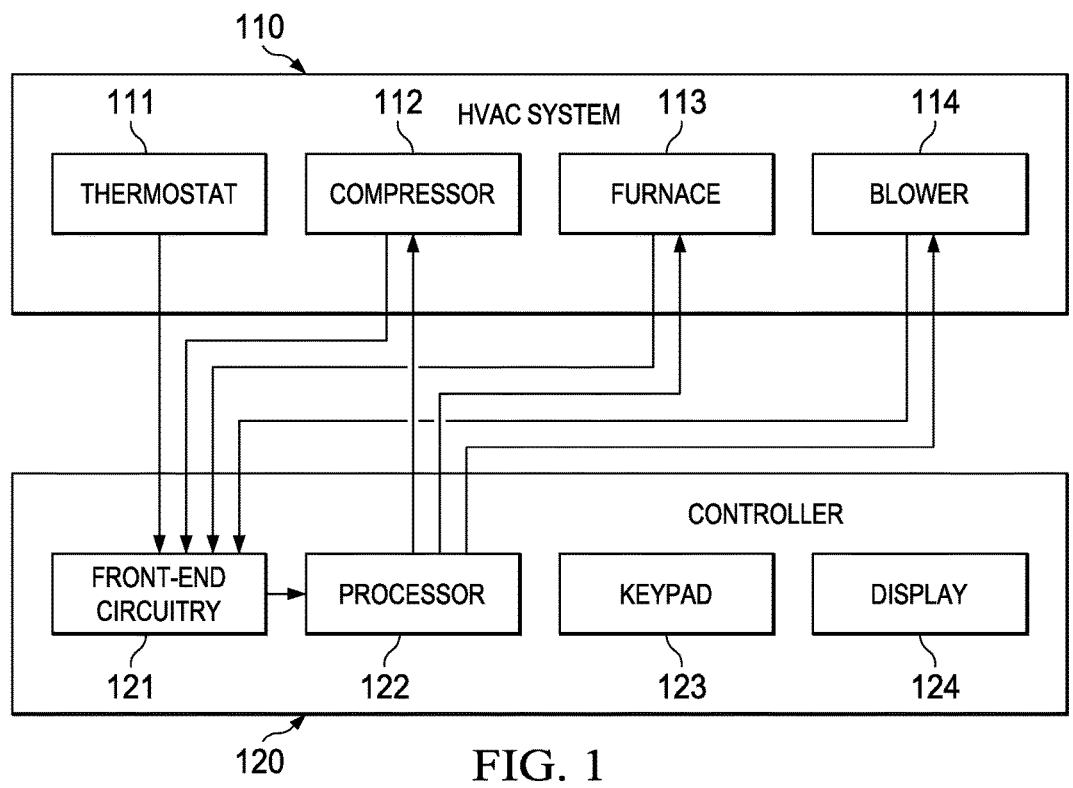
FIG. 1 is a high-level block diagram of an HVAC system and a controller therefor.

FIG. 1 is a high-level block diagram of an HVAC system 110 and a controller 120 therefor. The HVAC system 110 includes a thermostat 111, a compressor 112, a furnace 113 and a blower 114, which are associated with each other in that ones of them are coupled to and cooperate with one another. The thermostat 111 is configured to generate commands to cool, warm and/or move air through the HVAC system, typically as a function of the relationship between a sensed indoor temperature and a set point temperature. The compressor 112 is configured to compress and propel a refrigerant through a loop to transfer heat between evaporator and condenser coils (not shown) to cool air passing through the evaporator coils. The furnace 113 is configured to heat air either by gas combustion or electrical resistance. The blower 114 is configured to pull air from a conditioned space (e.g., a building interior), through the evaporator coils and/or furnace 113 and reintroduce the air back into the conditioned space.

Those skilled in the pertinent art will understand that HVAC systems may take many alternative forms. For example, some HVAC systems have dehumidifiers, while others have heat pumps that operate in conjunction with or in lieu of the compressor 112 and furnace 113. Still others have multiple compressors or multi-stage compressors. Yet others have multiple furnaces and/or multiple blowers, dampers or other equipment. Though "HVAC" implies that the HVAC system is capable of both cooling and heating air, the term is used generically to encompass systems that either cool or heat air and even those that only ventilate air by means of a blower without either cooling or heating the air. Further, the invention is not limited to a particular type, size or configuration of HVAC system.

The controller 120 includes front-end circuitry 121, a processor 122, a keypad 123 and a display 124. The processor 122 is configured to execute software or firmware instructions to carry out computations and logical operations that typically constitute a useful process. In the embodiment of FIG. 1, the processor 122 is configured to control the HVAC system 110 based on various input signals and one or more control algorithms. Various unreferenced arrows in FIG. 1 leading from the thermostat 111, the compressor 112, the furnace 113 and the blower 114 to the front-end circuitry 121, then to the processor 122 then back to the compressor 112, the furnace 113 and the blower 114 illustrate one embodiment of a control flow involving the HVAC system 110 and the controller 120. The processor 122 may be of any conventional or later-developed type, including: a microcontroller, a microprocessor, a digital signal processor and a programmable gate array. Other processor types may be employed in still other embodiments.

The keypad 123 is an input device having multiple depressible keys, buttons or touch-sensitive display areas configured to generate input signals for the processor 122. The keypad 123 may allow, for example, a service technician to program, configure, diagnose or change the operation of the HVAC system 110 or controller 120. The display 124 is an output device that the processor 122 can drive to display text, images or a combination of both. In the illustrated embodiment, the display 124 is a liquid crystal display. In an alternative embodiment, the display 124 is of another conventional or later-developed type.

The front-end circuitry 121 is coupled to interrupt pins (not shown in FIG. 1) of the processor 122. The front-end circuitry 121 is generally configured to convert and select among various input signals received from one or more of the thermostat 111, the compressor 112, the furnace 113 and the blower 114 or other (unshown) components of the HVAC system 110.

In one specific embodiment, the front-end circuitry 121 is configured to convert and multiplex, namely to convert received AC input signals into corresponding square wave signals of a digital logic voltage and select one of the square wave signals to provide to an interrupt pin of the processor 122. When the selected square wave signal is asserted (achieves a logical one binary state), an interrupt occurs, whereupon interrupt-handing software or firmware executing in the processor 122 and constituting a sample analyzer scans (samples the value of) the interrupt pin over a short window of time and count the number of assertions. If at least a threshold number of assertions is reached after the window of time has elapsed, a binary state of one is assumed to be the binary state of the input signal. If the threshold number of assertions is not reached after the window of time has elapsed, a binary state of zero is assumed to be the binary state of the input signal.

In another specific embodiment, the front-end circuitry 121 is configured to convert, multiplex, sample and analyze, namely to convert received AC input signals into corresponding square wave signals of a digital logic voltage, select one of the square wave signals, employ a clock signal, a gate and a counter (not shown in FIG. 1) to sample and analyze the selected square wave signal. The counter asserts a signal if at least a threshold number of assertions is reached during a short window of time. The output of the counter is provided to an interrupt pin of the processor 122. When signal from the counter is asserted, an interrupt occurs, and interrupt-handling software or firmware executing in the processor 122 assumes a binary state of one to be the binary state of the input signal. If the threshold number of assertions is not reached after the window of time has elapsed, no interrupt is generated, and a binary state of zero is assumed to be the binary state of the input signal.

In each of the specific embodiments, a different square wave signal is then selected, and the process repeats such that multiple input signals may be assigned to a particular interrupt pin. In related embodiments, multiple input signals may be assessed concurrently using multiple instances of the front-end circuitry 121 for corresponding multiple interrupt pins.

The first specific embodiment described above requires less scanning on the part of the processor than conventionally required but still requires some scanning during the short window of time. The second specific embodiment described above requires no scanning, but requires more hardware and a clock signal, such as that provided by a timer associated with the processor 122. Each embodiment may be more advantageous in a given application, particularly depending upon the capabilities of the processor 122 selected for the application.

Figure 2:
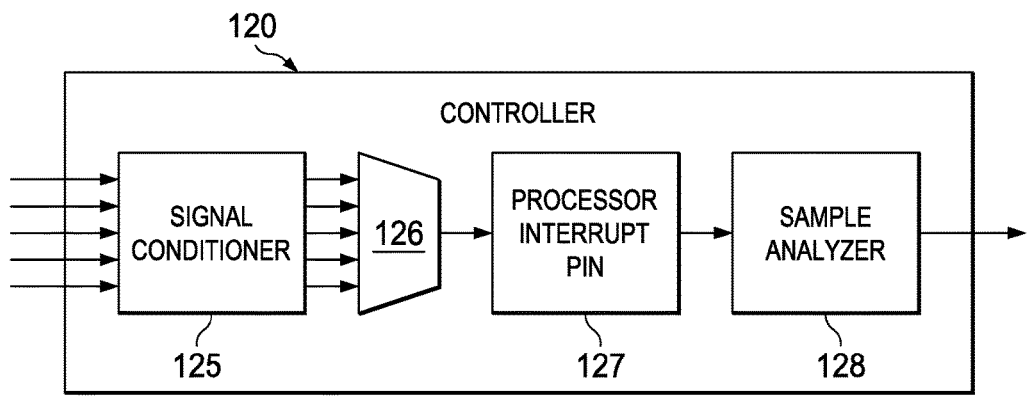
FIG. 2 is a block diagram of a portion of a first embodiment of the controller of FIG. 1 showing, in particular, multiplexed input signal detection embodied therein.

FIG. 2 is a block diagram of a portion of a first embodiment of the controller of FIG. 1 showing, in particular, multiplexed input detection embodied therein. In the embodiment of FIG. 2, the controller 120 includes a signal conditioner 125, a multiplexer 126, and involves an interrupt pin 127 of the processor 122 of FIG. 1 and a sample analyzer embodied in software or firmware executing in the processor 122 of FIG. 1. The signal conditioner 125 is configured to convert received AC input signals into corresponding square wave signals of a digital logic voltage. The embodiment of FIG. 1 is capable of being employed with HVAC systems of different control voltage. Those skilled in the pertinent art understand that control voltages may typically range from 18 VAC to 30 VAC. Thus, the controller 120 is configured to adapt its operation to operate with various control voltages. Those skilled in the pertinent art also understand that a digital logic voltage may be, e.g., 5 V, 3.3 V, or any other voltage internally employed in the controller 120 by, e.g., the processor 122. For example, if the control voltage of the HVAC system 110 is 24 VAC and the digital logic voltage employed within the controller 120 is 5 volts, the signal conditioner 125 is configured to convert a 24 VAC sine wave representing an input signal into a 5 volt square wave signal. The signal conditioner 125 may convert a sine wave into a square wave by any number of conventional techniques. For example, the amplitude of the sine wave may be provided to a comparator, which may be set to detect peaks, zero-crossings or crossings of intermediate voltages. Those skilled in the art are aware of many conventional circuits for deriving a square wave from a sine wave; a general discussion of such techniques is outside the scope of this disclosure.

The multiplexer 126 is configured to receive multiple square wave signals and select among them one for further analysis. In the illustrated embodiment, the processor drives the multiplexer 126 to select among the square wave signals in a round-robin manner. The multiplexer 126 provides the selected square wave signal to the processor interrupt pin 127. When the selected square wave signal is asserted (achieves a logical one binary state) on the interrupt pin 127, an interrupt (which may be maskable or unmaskable, depending upon the application) occurs. The sample analyzer 128, which in the embodiment of FIG. 2 takes the form of interrupt-handing software or firmware executing in the processor 122 scans the interrupt pin 127 over a short window of time (for example, 500 milliseconds) and counts the number of assertions. If at least a threshold number of assertions is reached after the window of time has elapsed, a binary state of one is assumed to be the binary state of the input signal. If the threshold number of assertions is not reached after the window of time has elapsed, a binary state of zero is assumed to be the binary state of the input signal. For example, if the threshold number of assertions is set at 20, 19 assertions will be deemed insufficient to indicate a binary state of one, but 20 assertions will be. The threshold number of assertions may be increased to reduce the number of false positive errors or decreased to reduce the time required to identify a true binary state of one.

Figure 3:
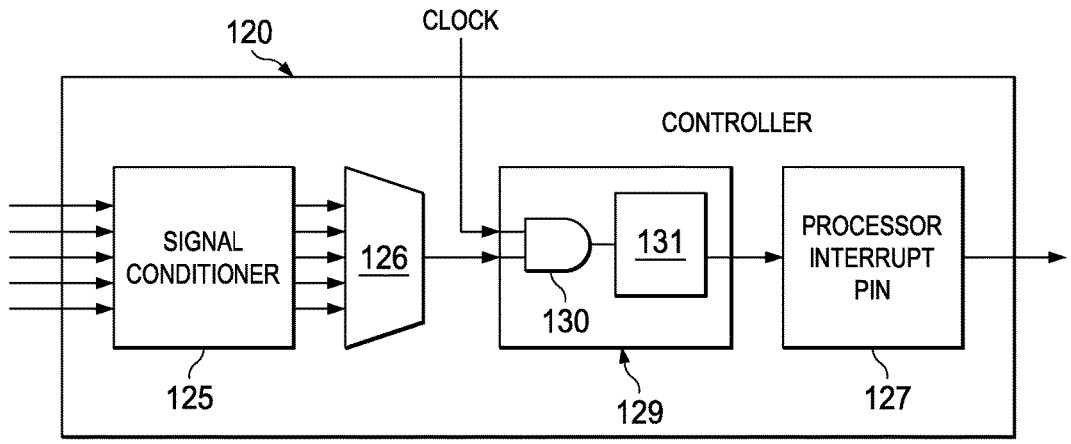
FIG. 3 is a block diagram of a portion of a second embodiment of the controller of FIG. 1 showing, in particular, multiplexed input signal detection embodied therein.

FIG. 3 is a block diagram of a portion of a second embodiment of the controller of FIG. 1 showing, in particular, multiplexed input detection embodied therein. The controller 120 of FIG. 3 shares some similarities with that of FIG. 2. The signal conditioner 125 is configured to convert received AC input signals into corresponding square wave signals of a digital logic voltage; the multiplexer 126 is configured to receive multiple square wave signals and select among them one for further analysis; and the processor interrupt pin 127 is employed to trigger interrupt handing software or firmware executing in the processor 122. However, the embodiment of FIG. 3 includes a sampler/sample analyzer 129 configured to sample the square wave signal and assert a signal on the processor interrupt pin 127 if at least a threshold number of assertions is reached during a short window of time. A clock signal representing a desired sample rate is provided to the sampler/sample analyzer 129. Along with the output of the multiplexer 126, a clock signal representing a sample rate may be provided to a gate 130 (e.g., an AND gate) in the sampler/sample analyzer 129. The output of the gate 130 is then provided to a counter 131 that counts, up or down, the number of assertions occurring during a window of time. If the number of assertions reaches a threshold number, the counter 131 asserts an interrupt via the interrupt pin 127, and interrupt-handling software or firmware executing in the processor 122 assumes a binary state of one to be the binary state of the input signal. If the threshold number of assertions is not reached after the window of time has elapsed, no interrupt is generated and the counter resets, and a binary state of zero is assumed to be the binary state of the input signal.

In an alternative embodiment, the output of the gate 130 is provided directly to the interrupt pin 127, and the counter (as a discrete element of the circuit) is omitted. Instead, the processor 122 is operable as the counter in a manner that is familiar to those skilled in the pertinent are.

Figure 4:
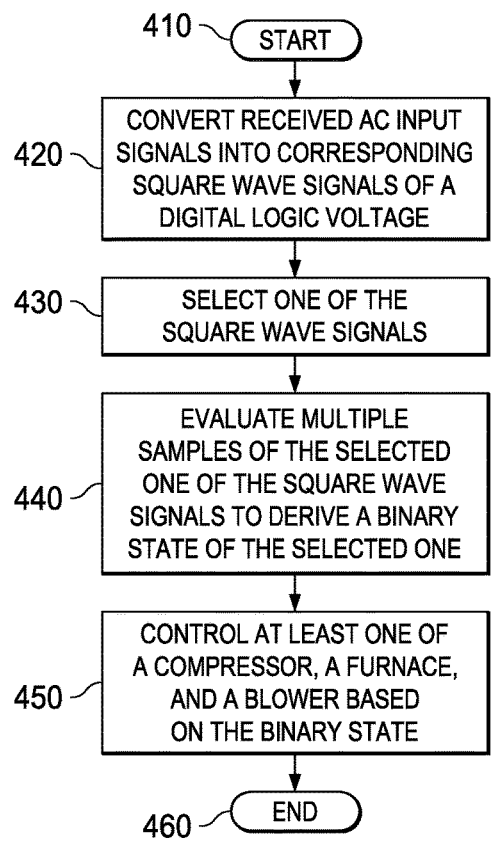
FIG. 4 is a flow diagram of one embodiment of a method of detecting multiplexed input signals.

FIG. 4 is a flow diagram of one embodiment of a method of detecting multiplexed input signals. The method begins in a start step 410. In a step 420, received AC input signals are converted into corresponding square wave signals of a digital logic voltage. In a step 430, one of the square wave signals is selected. In a step 440, multiple samples of the selected one of the square wave signals are evaluated to derive a binary state of the selected one. In a step 450, at least one of a compressor, a furnace and a blower are controlled based on the binary state. The method ends in an end step 460.

At least a portion of the above-described apparatuses and methods may be embodied in or performed by various conventional digital data processors, microprocessors or computing devices, wherein these devices are programmed or store executable programs of sequences of software instructions to perform one or more of the steps of the methods, e.g., steps of the method of FIG. 4. The software instructions of such programs may be encoded in machine-executable form on conventional digital data storage media that is non-transitory, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, e.g., one or more of the steps of the method of FIG. 4. Additionally, an apparatus, such as an HVAC controller, may be designed to include the necessary circuitry or programming to perform each step of a method of disclosed herein.

Portions of disclosed embodiments may relate to computer storage products with a non-transitory computer-readable medium that have program code thereon for performing various computer-implemented operations that embody a part of an apparatus, system, or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. An HVAC controller, comprising:
a signal conditioner configured to convert received alternating current (AC) input signals into corresponding square wave signals of a digital logic voltage;
a multiplexer coupled to said signal conditioner and configured to select one of said square wave signals;

a sample analyzer coupled to said multiplexer and configured to evaluate multiple samples of said selected one of said square wave signals to derive a binary state; and wherein said sample analyzer comprises a gate and a counter and is configured to employ a clock signal to sample said selected one of said square wave signals;

wherein the counter of the sample analyzer is configured to determine a total number of assertions of said selected one of said square wave signals occurring during a window of time;

responsive to a determination that the total number of assertions of said selected one of said square wave signals reaches a threshold number of assertions during the window of time, the derived binary state is assumed to be one; and responsive to a determination that the total number of assertions of said selected one of said square wave signals does not reach the threshold number of assertions during the window of time, the derived binary state is assumed to be zero.

2. The controller as recited in claim 1 wherein said multiplexer is further coupled to an interrupt pin of a processor and said sample analyzer is embodied in a selected one of interrupt-handling software and firmware executing in said processor.

3. The controller as recited in claim 1 wherein said sample analyzer is further configured to provide said binary state to an interrupt pin of a processor.

4. The controller as recited in claim 1 wherein said threshold number of assertions is 20.

5. The controller as recited in claim 1 wherein said AC input signals are at a control voltage and said square wave signals are at the digital logic voltage.

6. The controller as recited in claim 1 wherein said multiplexer is configured to select among said square wave signals in a round-robin manner.

7. An HVAC system, comprising:
a compressor;
a furnace;
a blower; and
a controller associated with said compressor, said furnace and said blower, said controller having:
a signal conditioner configured to convert alternating current (AC) input signals from at least one of said compressor, said furnace and said blower into corresponding square wave signals of a digital logic voltage;
a multiplexer coupled to said signal conditioner and configured to select one of said square wave signals;
a sample analyzer coupled to said multiplexer and configured to evaluate multiple samples of said selected one of said square wave signals to derive a binary state;
wherein said sample analyzer comprises a gate and a counter and is configured to employ a clock signal to sample said selected one of said square wave signals;
wherein the counter of the sample analyzer is configured to determine a total number of assertions of said selected one of said square wave signals occurring during a window of time;
responsive to a determination that the total number of assertions of said selected one of said square wave signals reaches a threshold number of assertions during the window of time, the derived binary state is assumed to be one; and
responsive to a determination that the total number of assertions of said selected one of said square wave signals does not reach the threshold number of assertions during the window of time, the derived binary state is assumed to be zero.

8. The system as recited in claim 7 wherein said multiplexer is further coupled to an interrupt pin of a processor and said sample analyzer is embodied in a selected one of interrupt-handling software and firmware executing in said processor.

9. The system as recited in claim 7 wherein said sample analyzer is further configured to provide said binary state to an interrupt pin of a processor.

10. The system as recited in claim 7 wherein said threshold number of assertions is 20.

11. The system as recited in claim 7 wherein said AC input signals are at a control voltage and said square wave signals are at the digital logic voltage.

12. The system as recited in claim 7 wherein said multiplexer is configured to select among said square wave signals in a round-robin manner.

* * * * *